US012016468B2

(12) United States Patent
Shipman et al.

(10) Patent No.: US 12,016,468 B2
(45) Date of Patent: Jun. 25, 2024

(54) SENSORY AND EXPERIENTIAL ENHANCEMENTS FOR PATIENT CARE SETTINGS WITHIN HOME AND HOSPITAL ENVIRONMENTS

(71) Applicants: David Shipman, Macatawa, MI (US); Cynthia Tripp, Macatawa, MI (US)

(72) Inventors: David Shipman, Macatawa, MI (US); Cynthia Tripp, Macatawa, MI (US)

( * ) Notice: Subject to any disclaimer, the term of this patent is extended or adjusted under 35 U.S.C. 154(b) by 28 days.

(21) Appl. No.: 17/884,013

(22) Filed: Aug. 9, 2022

(65) Prior Publication Data

US 2023/0048676 A1 Feb. 16, 2023

Related U.S. Application Data

(60) Provisional application No. 63/351,622, filed on Jun. 13, 2022, provisional application No. 63/231,841, filed on Aug. 11, 2021.

(51) Int. Cl.
*A61G 5/14* (2006.01)
*A47C 7/14* (2006.01)
*A47C 7/46* (2006.01)

(52) U.S. Cl.
CPC .................. *A47C 7/14* (2013.01); *A47C 7/46* (2013.01); *A61G 5/14* (2013.01)

(58) Field of Classification Search
CPC .................................... A61G 5/14; A47C 3/22
USPC ........................................... 297/DIG. 10, 339
See application file for complete search history.

(56) References Cited

U.S. PATENT DOCUMENTS 4,059,305 A * 11/1977 Ammirata .............. A47C 1/034 297/DIG. 10
4,688,851 A * 8/1987 Whiteford ................ A61G 5/14 297/DIG. 10
4,690,457 A * 9/1987 Poncy ...................... A61G 5/14 297/DIG. 10
4,778,217 A * 10/1988 Lane ........................ A61G 5/14 297/DIG. 10
4,838,612 A * 6/1989 Cross ....................... A61G 5/14 297/DIG. 10
4,872,223 A * 10/1989 Baird ....................... A61G 5/14 297/DIG. 10
4,929,022 A * 5/1990 Geraci ..................... A61G 5/14 297/DIG. 10
4,979,726 A * 12/1990 Geraci ..................... A61G 5/14 297/DIG. 10

(Continued)

FOREIGN PATENT DOCUMENTS

CN 204790720 U 11/2015
GB 2154440 A * 9/1985 ............... A61G 5/14

*Primary Examiner* — Rodney B White
(74) *Attorney, Agent, or Firm* — Price Heneveld LLP

(57) ABSTRACT

A seating module for use with a chair frame includes a perimeter frame member. A resilient internal platform is attached to the perimeter frame member at a static portion. An upper seat cushion is disposed on top of a resilient internal platform. The resilient internal platform is biased to an original shape that defines a resting position. Upon a patient resting upon the resilient internal platform, the resilient internal platform deflects in a downward direction toward a seating position and contemporaneously exerts an upward biasing force that assists the patient in reaching a seated position and also assists the patient in moving upward from the seated position.

15 Claims, 30 Drawing Sheets

(56) References Cited

U.S. PATENT DOCUMENTS

| | | | | |
|---|---|---|---|---|
| 5,011,224 | A * | 4/1991 | Paul | A61G 5/14 297/DIG. 10 |
| 5,082,327 | A * | 1/1992 | Crisp | A61G 5/14 297/DIG. 10 |
| 5,178,025 | A * | 1/1993 | Bennett | A61G 5/14 297/DIG. 10X |
| 5,333,931 | A * | 8/1994 | Weddendorf | A61G 5/14 297/DIG. 10 |
| 5,513,867 | A * | 5/1996 | Bloswick | A61G 5/14 297/DIG. 10 |
| 5,884,935 | A * | 3/1999 | Tholkes | A61G 7/10 297/DIG. 10 |
| 5,898,953 | A * | 5/1999 | Paxon | A61G 5/14 297/DIG. 10 |
| 6,390,960 | B1 * | 5/2002 | Boland | A63B 21/055 482/907 |
| 6,565,157 | B2 | 5/2003 | Barile | |
| 6,945,604 | B2 * | 9/2005 | Splane, Jr. | A61G 7/1007 297/DIG. 10 |
| 7,000,988 | B2 * | 2/2006 | Bressler | A61G 5/14 297/DIG. 10 |
| 7,434,882 | B1 * | 10/2008 | Hodges | A61G 5/14 297/DIG. 10 |
| 7,455,360 | B2 * | 11/2008 | White | A61G 5/14 297/330 X |
| 7,654,949 | B2 | 2/2010 | McNew | |
| 8,113,587 | B1 * | 2/2012 | Zarinfar | A61G 5/0841 297/DIG. 10X |
| 8,740,304 | B2 * | 6/2014 | Yu | A61G 5/14 297/DIG. 10 |
| 9,492,339 | B2 | 11/2016 | Leib | |
| 11,141,667 | B2 | 10/2021 | Suzuki | |
| 2002/0117885 | A1 | 8/2002 | Barile | |
| 2007/0246986 | A1 * | 10/2007 | White | A47C 1/029 297/344.1 |
| 2013/0093230 | A1 * | 4/2013 | Yu | A61G 5/14 297/330 |
| 2014/0138995 | A1 | 5/2014 | Leib | |
| 2020/0101391 | A1 | 4/2020 | Suzuki | |
| 2020/0155391 | A1 * | 5/2020 | Morgan | A61G 5/1035 |
| 2020/0197246 | A1 * | 6/2020 | Kim | A61G 5/14 |

* cited by examiner

SENSORY AND EXPERIENTIAL ENHANCEMENTS FOR PATIENT CARE SETTINGS WITHIN HOME AND HOSPITAL ENVIRONMENTS

CROSS-REFERENCE TO RELATED APPLICATIONS

This application claims priority to and the benefit under 35 U.S.C. § 119(e) of U.S. Provisional Patent Application No. 63/231,841 filed on Aug. 11, 2021, entitled SENSORY AND EXPERIENTIAL ENHANCEMENTS FOR A HOSPITAL SETTING, and U.S. Provisional Patent Application No. 63/351,622 filed on Jun. 13, 2022, entitled SENSORY AND EXPERIENTIAL ENHANCEMENTS FOR PATIENT CARE SETTINGS WITHIN HOME AND HOSPITAL ENVIRONMENTS, the entire disclosures of which are hereby incorporated herein by reference.

FIELD OF THE DEVICE

The device is in the field of sensory experience mechanisms, and more specifically, sensory and experiential enhancement mechanisms that can be positioned within a patient care or hospice setting for providing sensory-based therapy to patients.

BACKGROUND OF THE DEVICE

Within hospitals and other care settings, it is typical that a television screen is provided for visual stimulation. Items that the patient happens to bring with them also provide visual stimulation. With certain conditions such as dementia and Alzheimer's disease, this television provides a limited amount of visual and auditory stimulation through this single interface.

SUMMARY OF THE DISCLOSURE

According to one aspect of the present device, a patient experience interface includes at least one display. An experience frame is positioned proximate the display. A sensory interface is positioned within the experience frame and includes a plurality of sensory stimulation devices. One of the sensory stimulation devices is a sunlight simulation device that operates independently or in conjunction with another of the sensory stimulation devices of the plurality of sensory stimulation devices. The plurality of sensory stimulation devices operate through a sequence of activations to stimulate various senses of a patient.

According to another aspect, a movement assist chair for use in a patient space includes a chair frame having a back and a plurality of legs. A seating module is attached to the chair frame and includes an upper seat cushion. A resilient internal platform is positioned within the seating module and below the upper seat cushion. The resilient internal platform is biased to a resting position. Upon a patient resting upon the resilient internal platform, the resilient internal platform deflects in a downward direction toward a seating position that is below the resting position and contemporaneously exerts an upward biasing force that assists the patient in reaching a seated position and also assists the patient is moving upward from the seated position to exit the seating module.

According to another aspect, a seating module for use with a chair frame includes a perimeter frame member. A resilient internal platform is attached to the perimeter frame member at a static portion. An upper seat cushion is disposed on top of a resilient internal platform. The resilient internal platform is biased to an original shape that defines a resting position. Upon a patient resting upon the resilient internal platform, the resilient internal platform deflects in a downward direction toward a seating position and contemporaneously exerts an upward biasing force that assists the patient in reaching a seated position and also assists the patient is moving upward from the seated position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
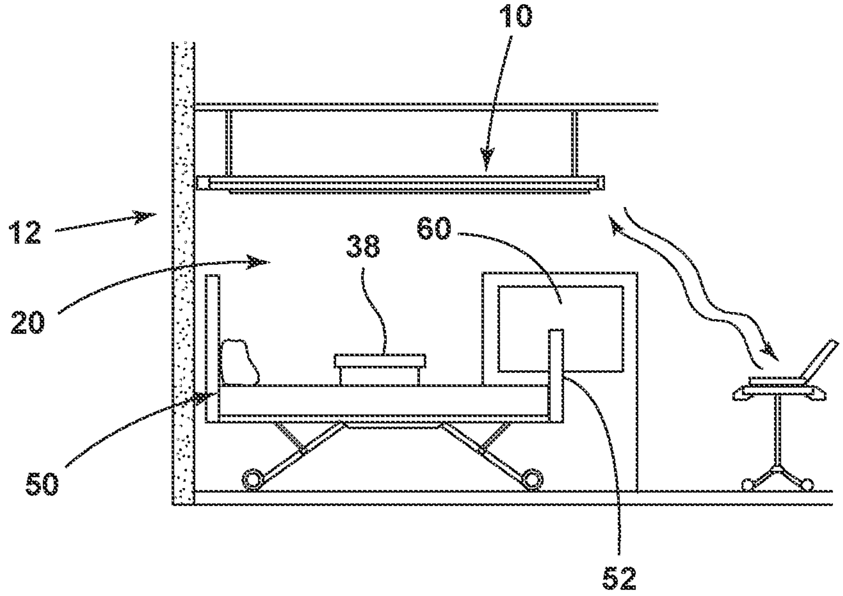
FIG. 1 is a schematic representation of aspects of a multi-sensory visual/electronic interface that are incorporated into a room for a patient.
Figure 2:
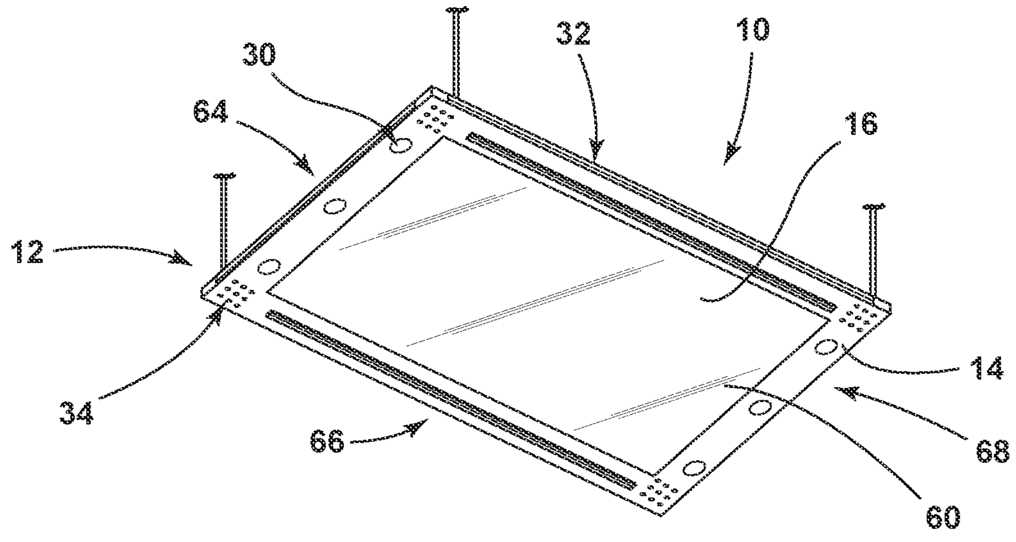
FIG. 2 is a perspective view of a display of the multi-sensory visual/electronic interface that can be mounted above a bed for a patient.
Figure 3:
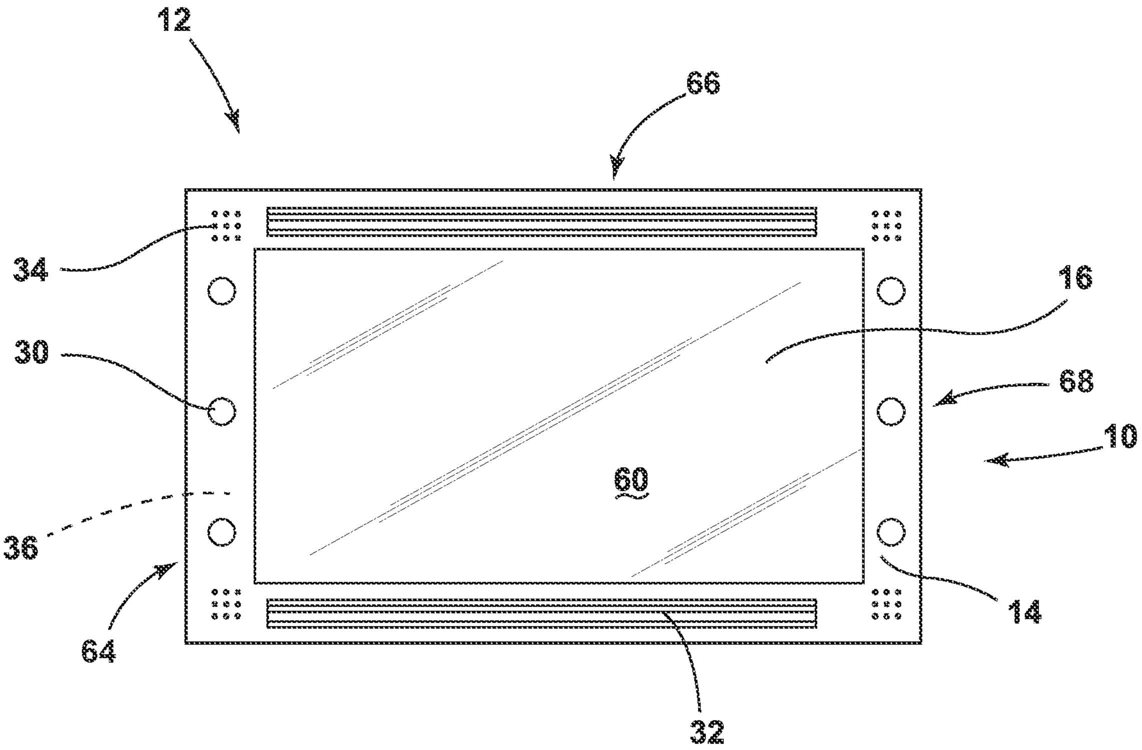
FIG. 3 is an elevation view of the display of FIG. 2.
Figure 4:
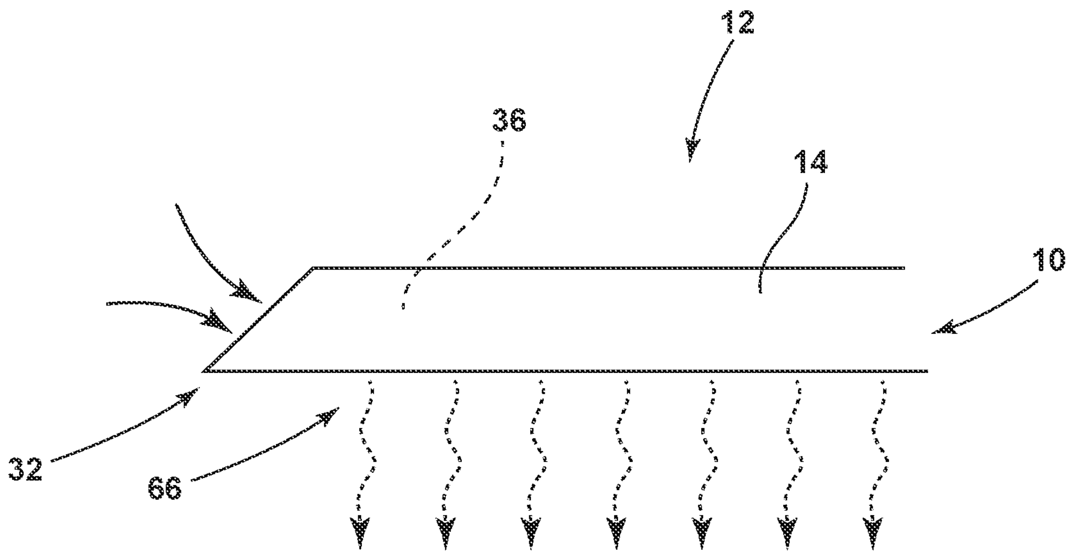
FIG. 4 is a schematic diagram illustrating an airflow component of the display of FIG. 2.
Figure 5:
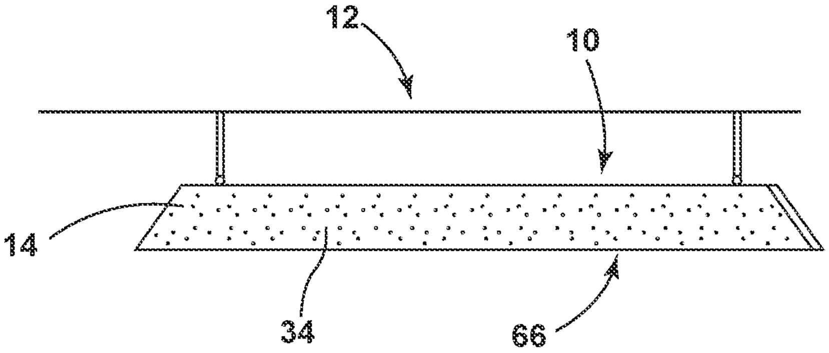
FIG. 5 is a side elevation view of the display of FIG. 2.
Figure 6:
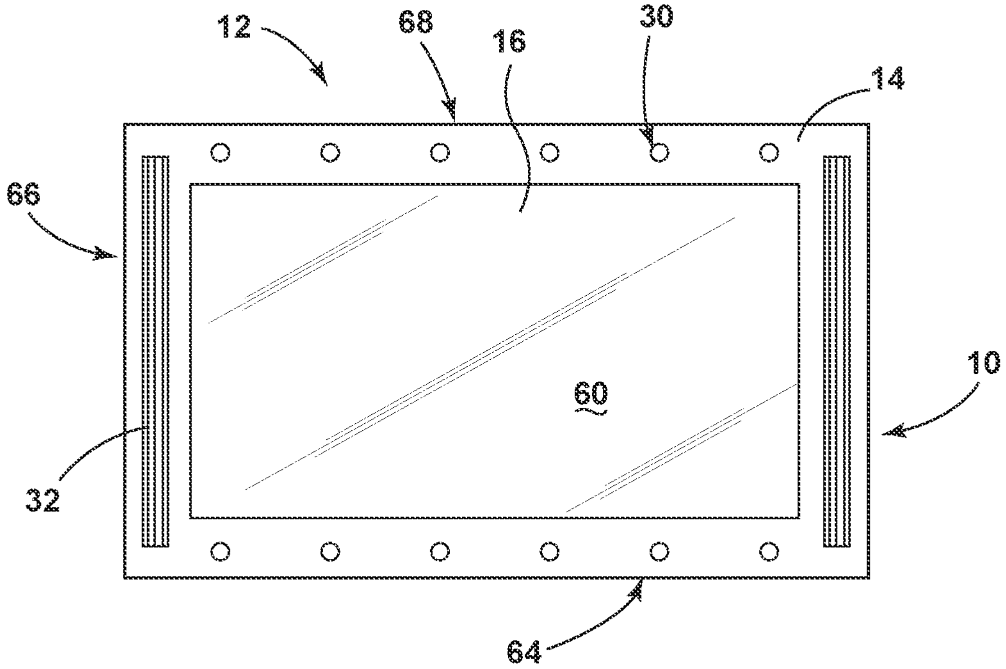
FIG. 6 is another side elevation view of the display of FIG. 2.
Figure 7:
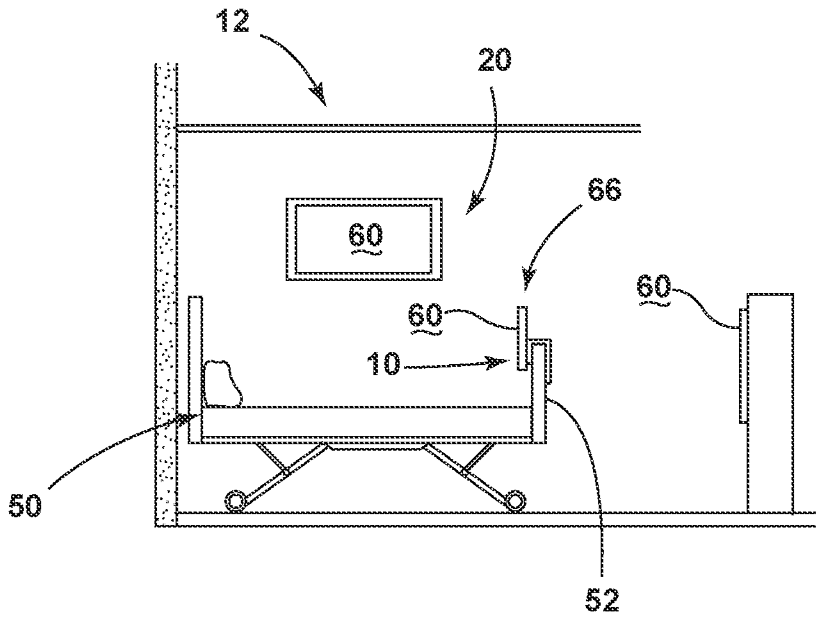
FIG. 7 is a schematic illustration showing a multi-sensory electronic screen that is mounted at a foot of the patient's bed.
Figure 8:
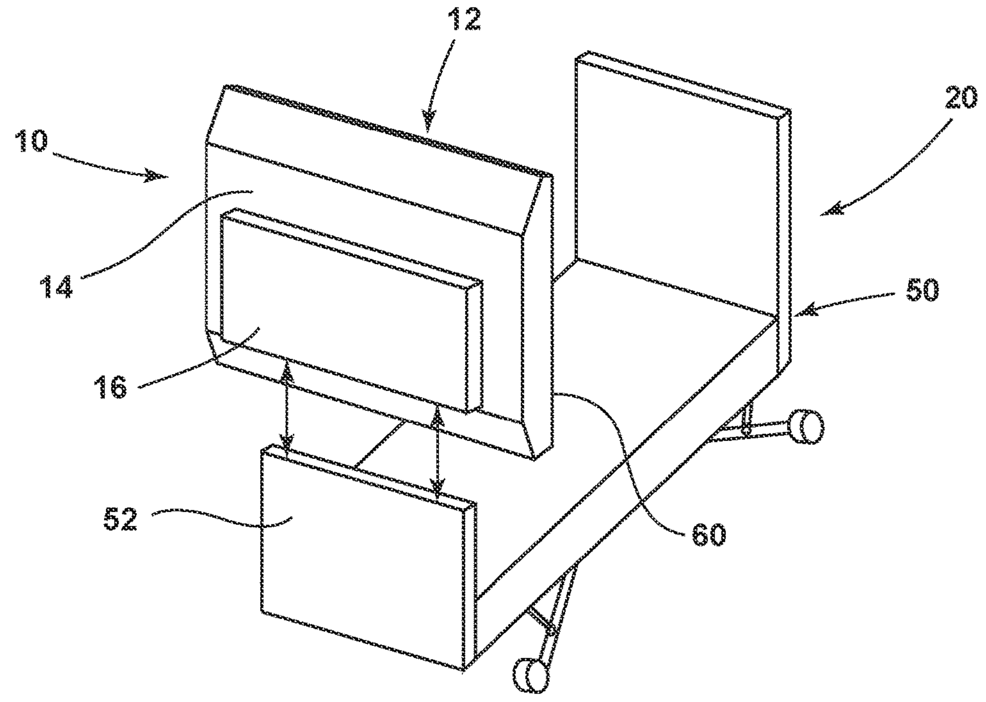
FIG. 8 is a perspective view of the multi-sensory electronic screen of FIG. 7.
Figure 9B:
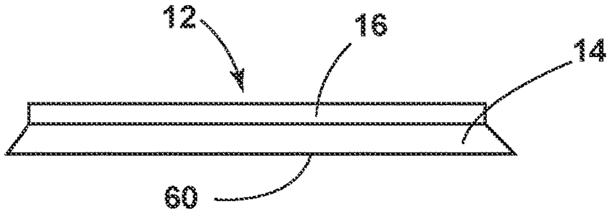
FIGS. 9A-9C are views of the multi-sensory electronic screen of FIG. 7.
Figure 9A:
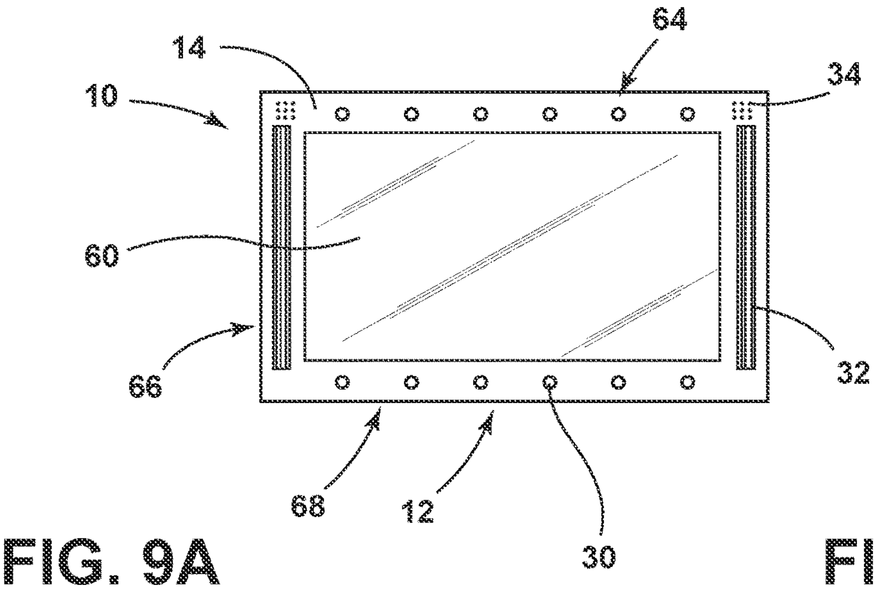
Figure 9C:
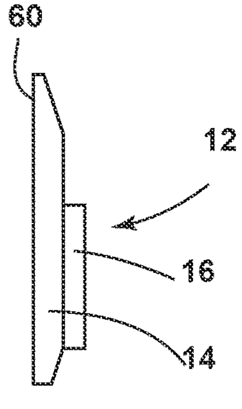
Figure 10:
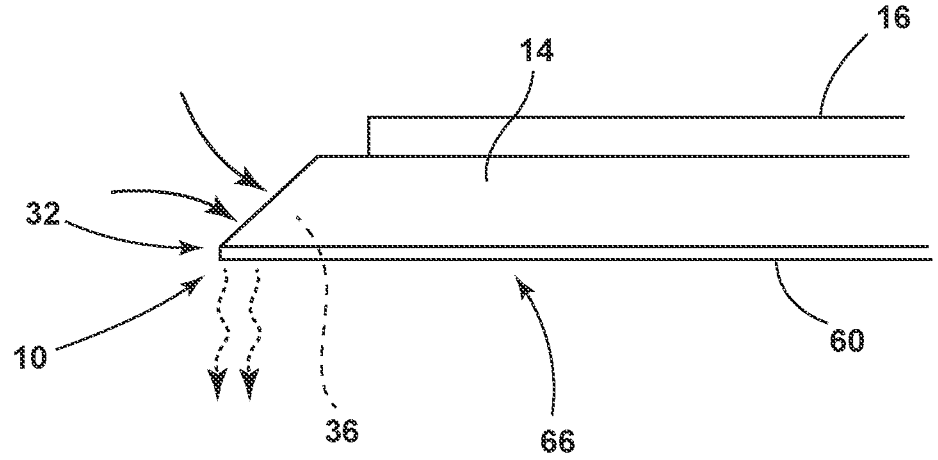
FIG. 10 is a detail schematic view of an airflow component of the display of FIG. 7.
Figure 11:
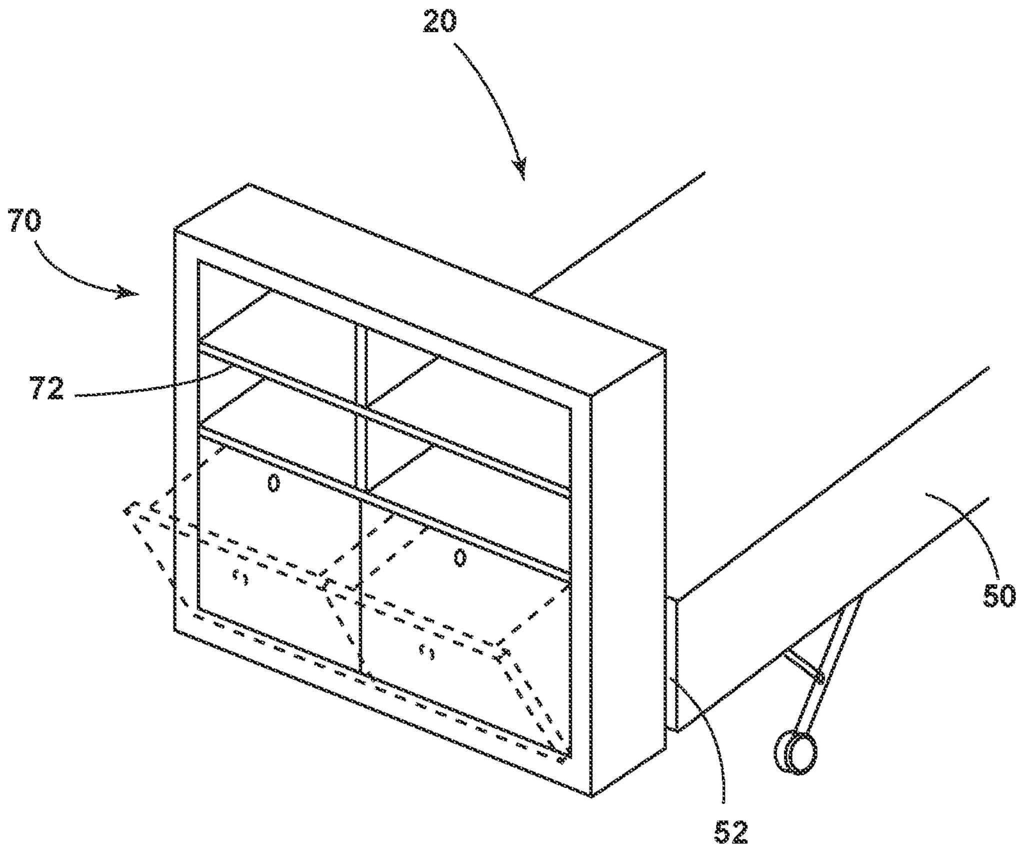
FIG. 11 is a perspective view of a modular storage unit attached to a patient bed.
Figure 12:
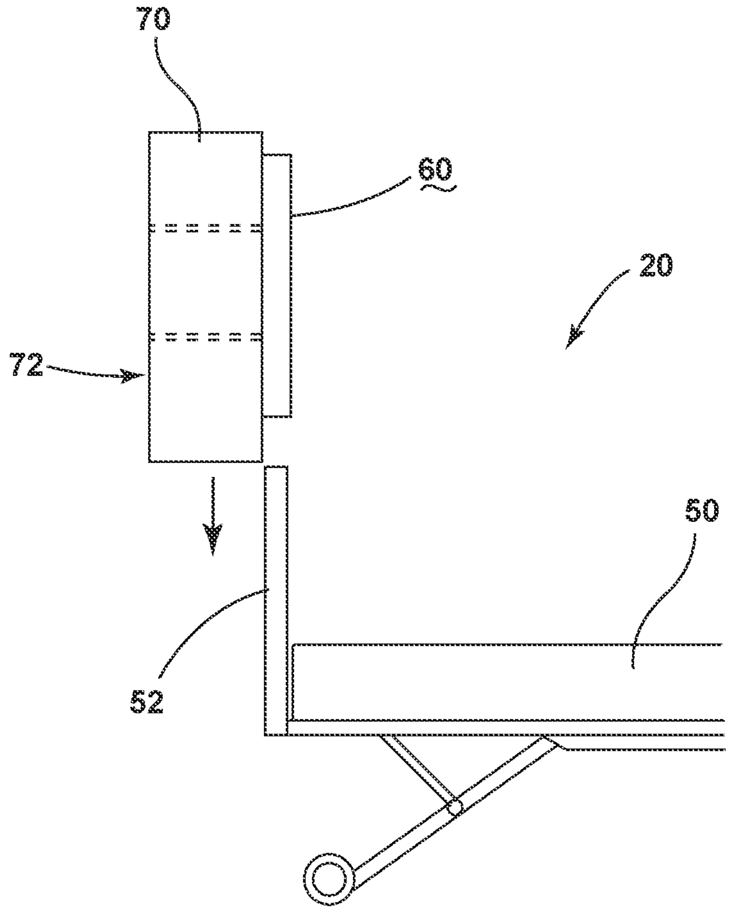
FIG. 12 is a schematic view of the modular storage unit of FIG. 11 and showing a mode of attaching the modular storage unit to a foot of a patient bed.
Figure 13B:
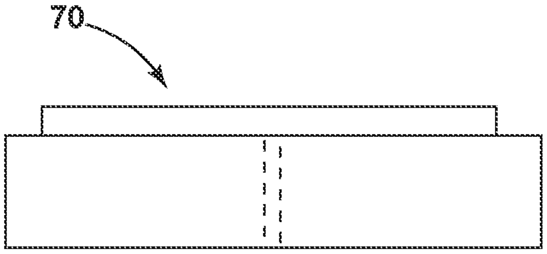
FIGS. 13A-13C are elevational views of an aspect of the modular storage unit of FIG. 11.
Figure 13A:
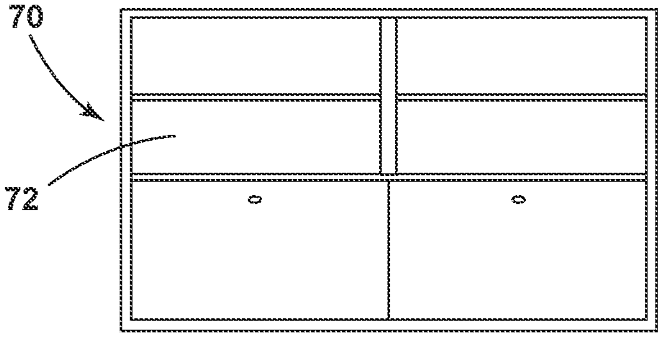
Figure 13C:
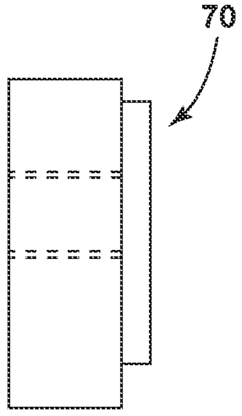
Figure 14A:
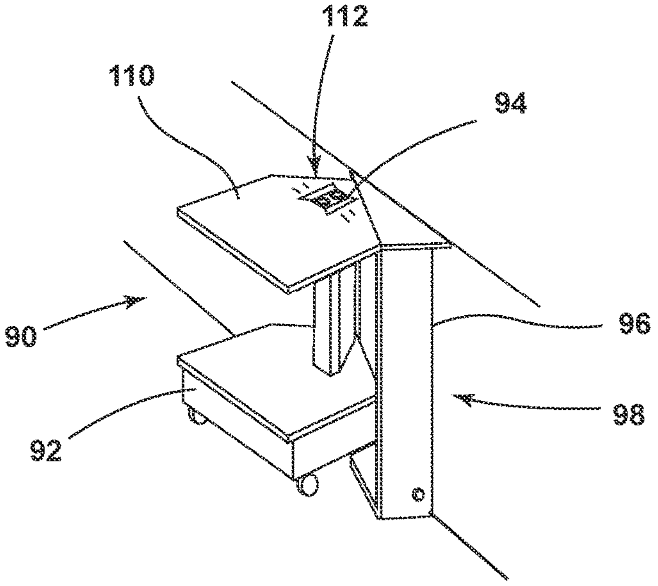
FIG. 14A is a perspective view of a modular rechargeable cart for storing patient items and powering and recharging patient electronics and displays, and shown coupled with a charging station.
Figure 14B:
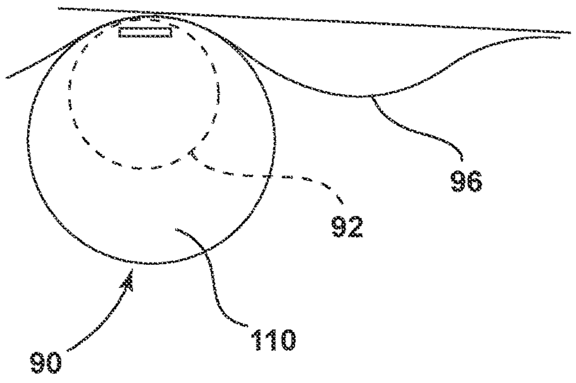
FIG. 14B is a plan view of an alternative aspect of the modular rechargeable cart and charging station.
Figure 15:
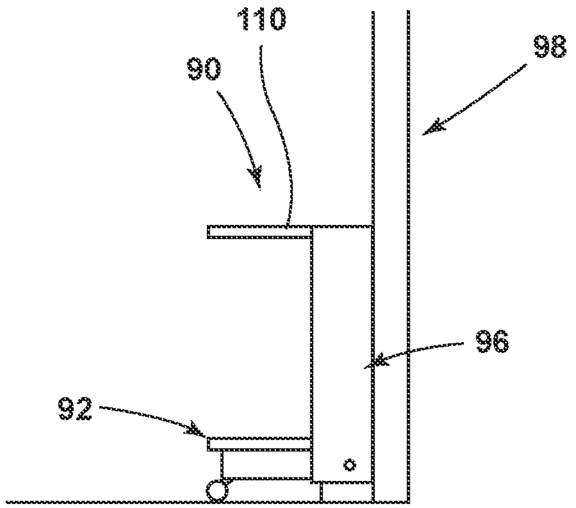
FIG. 15 is a side elevational view of an aspect of the modular rechargeable cart coupled with a charging station.
Figure 16A:
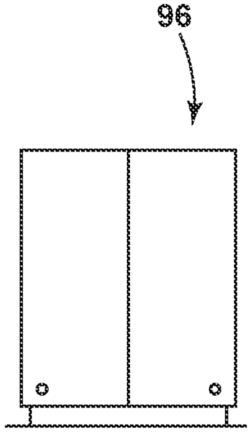
FIGS. 16A and 16B are elevational views of an aspect of the charging station for the modular rechargeable cart.
Figure 16B:
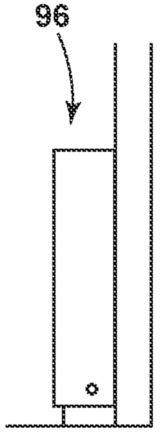
Figure 17A:
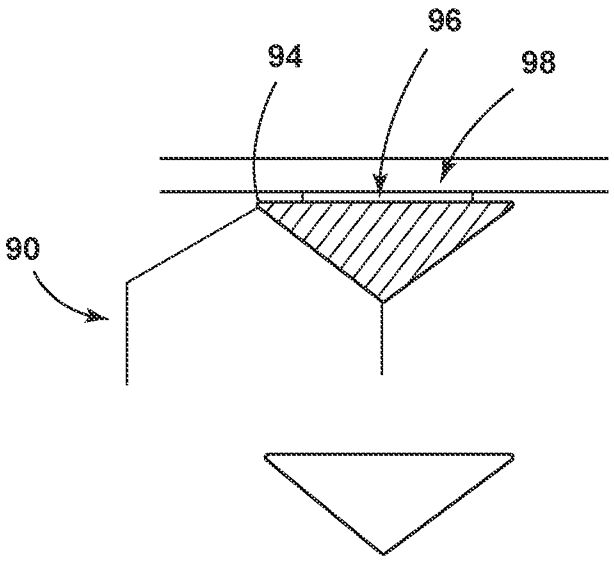
FIGS. 17A and 17B are plan views of aspects of the charging station for the modular rechargeable cart.
Figure 17B:
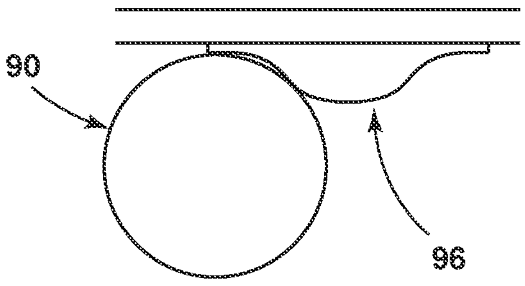
Figure 18:
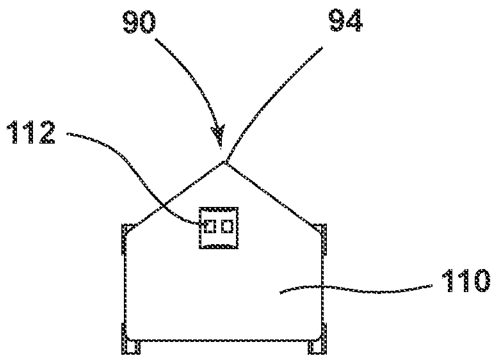
FIG. 18 is a plan view of an aspect of the modular rechargeable cart.
Figure 19:
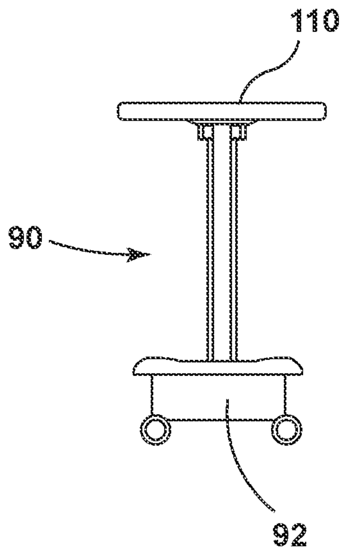
FIG. 19 is a side elevational view of the modular rechargeable cart of FIG. 18.
Figure 20:
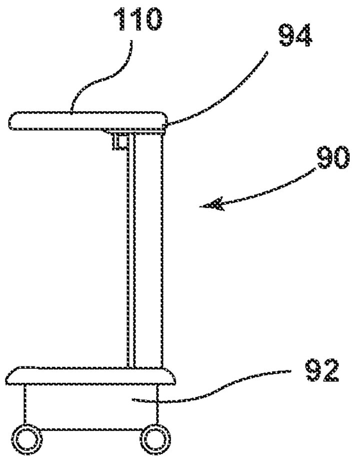
FIG. 20 is a second side elevational view of the modular rechargeable cart of FIG. 18.
Figure 21A:
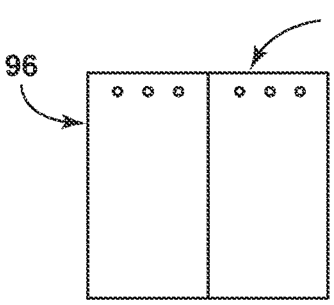
FIG. 21A-21E are views of accessory storage features of the modular rechargeable cart of FIG. 18.
Figure 21B:
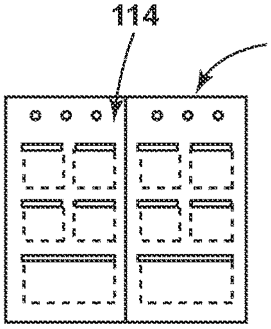
Figure 21C:
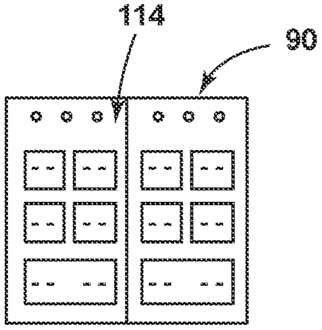
Figure 21D:
Figure 21E:
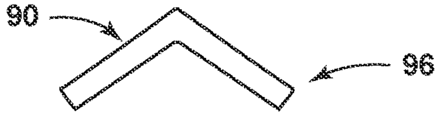
Figure 22:
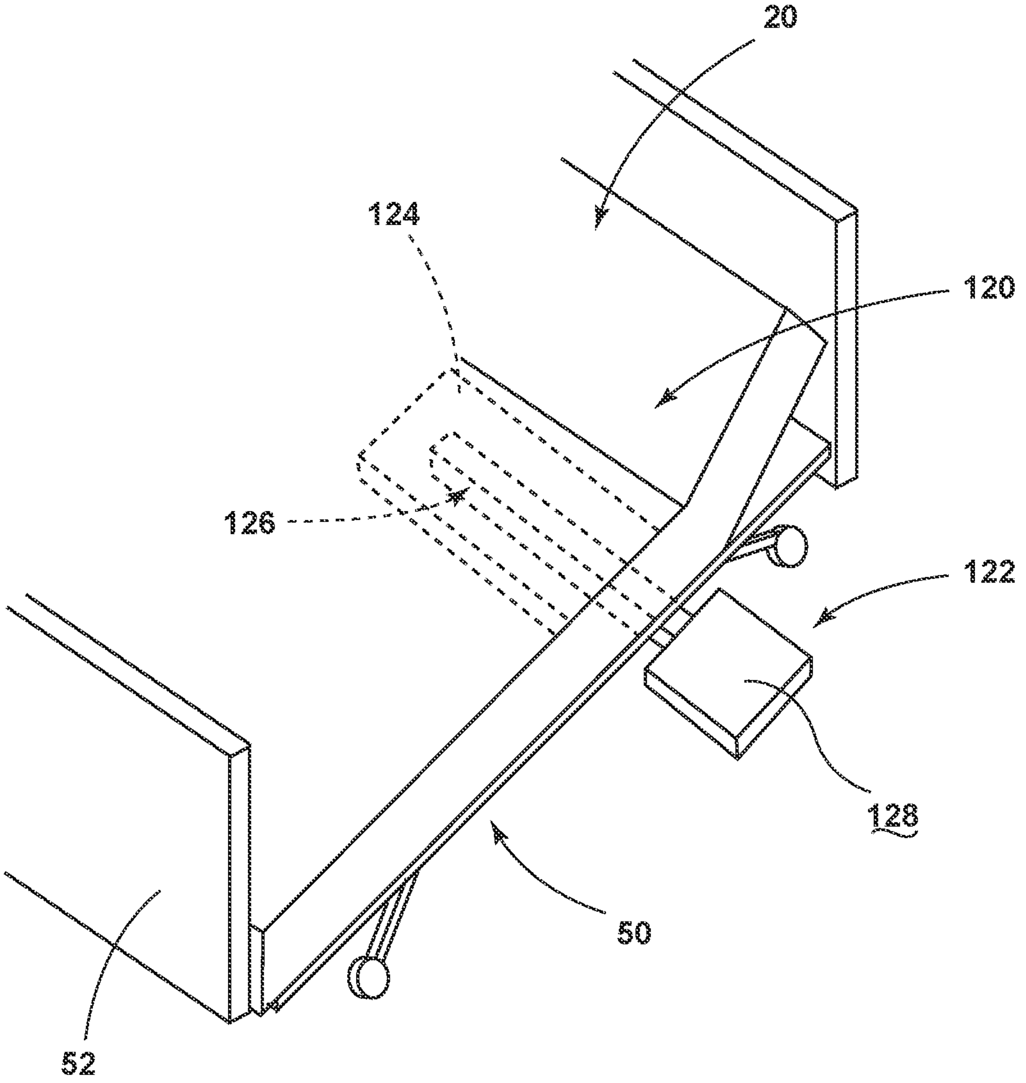
FIG. 22 is a schematic perspective view of an extendable seat that is incorporated within a patient bed for providing a cooperative seating arrangement within a care setting.
Figure 23:
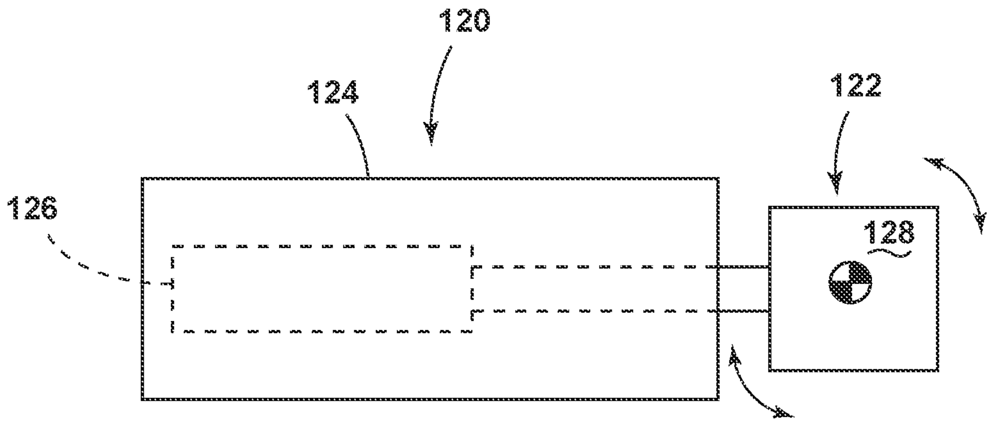
FIG. 23 is a plan view of the extendable seat of FIG. 22 shown in an extended position.
Figure 24:
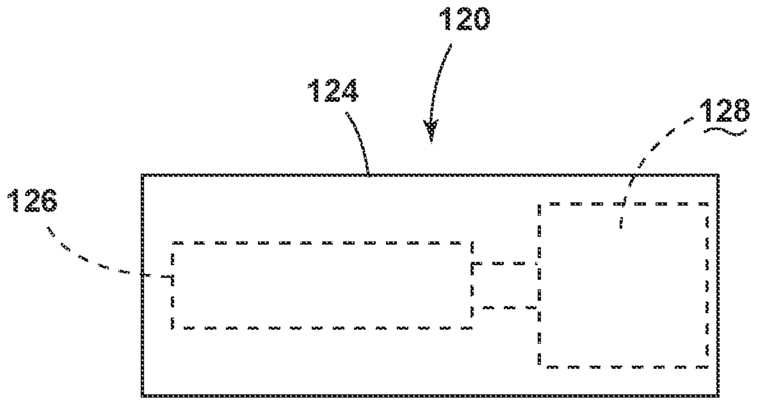
FIG. 24 is a plan view of the extendable seat of FIG. 23 and shown in a retracted position.
Figure 25:
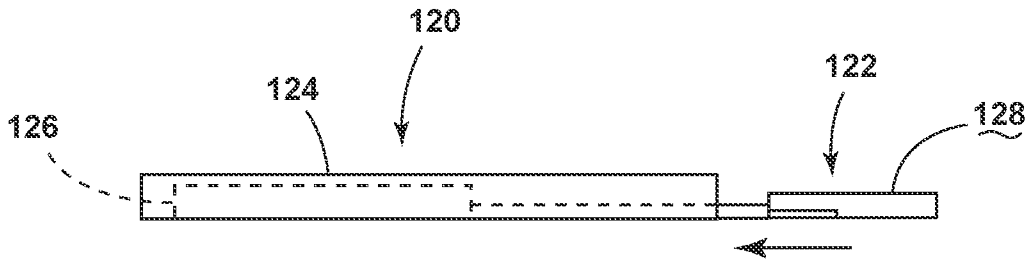
FIG. 25 is a schematic side view of the extend able seat of FIG. 22 and showing operation of the seat between the extended and retracted positions.
Figure 26:
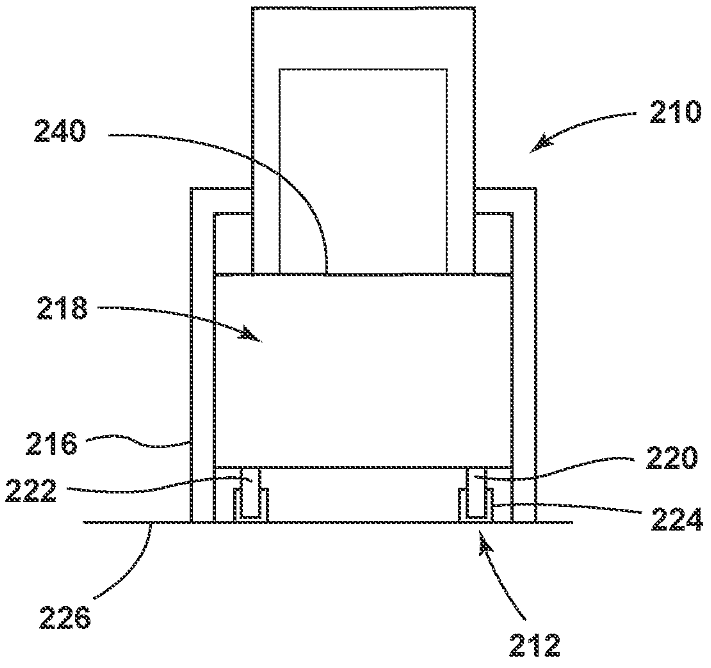
FIG. 26 is a side elevation view of a chair with a friction adjustment interface for assisting an occupant with moving the chair while seated and also while standing next to the chair.
Figure 27:
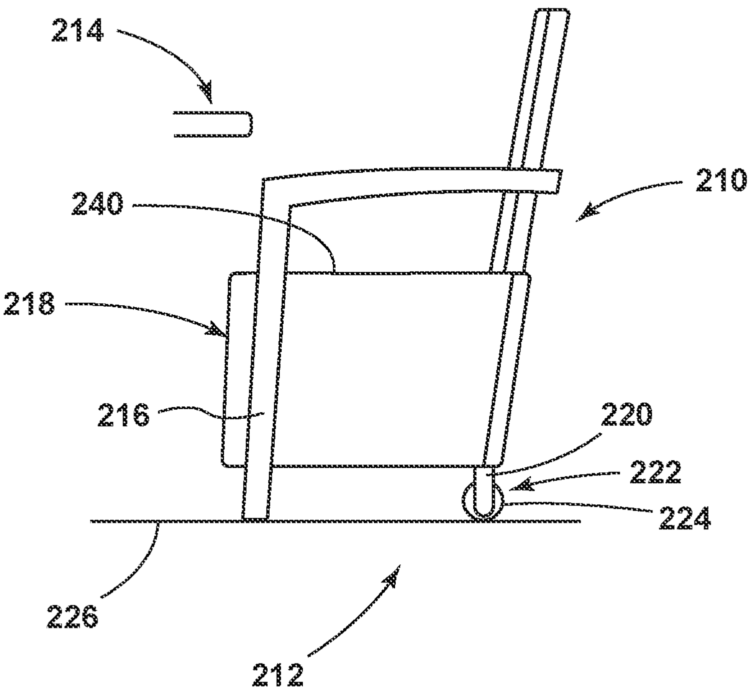
FIG. 27 is a second side elevation view of the chair of FIG. 26.
Figure 28:
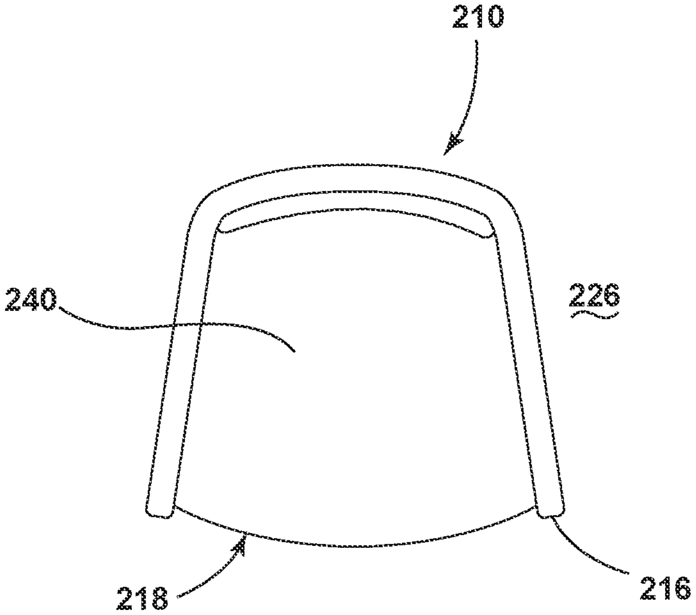
FIG. 28 is a plan view of the chair of FIG. 26.
Figure 29A:
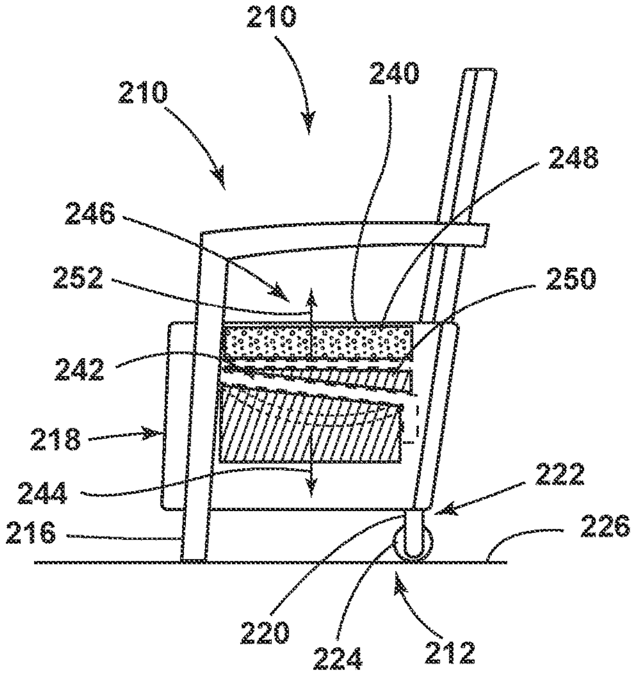
FIGS. 29A-29C are schematic cross-sectional views of aspects of the resilient internal platform that is incorporated into the internal structure of the chair for assisting an occupant with entering and exiting the chair.
Figure 29B:
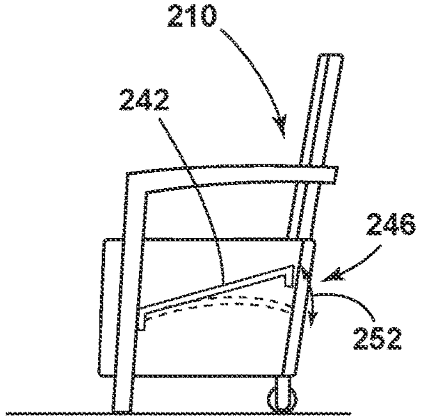
Figure 29C:
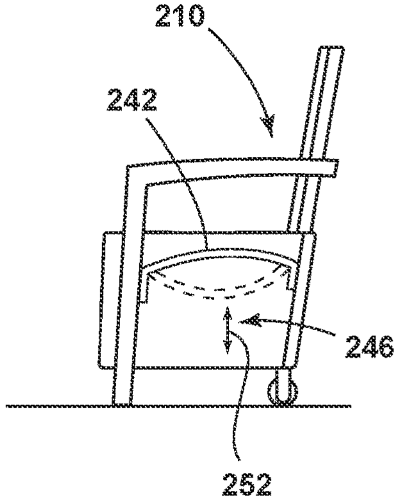
Figure 30:
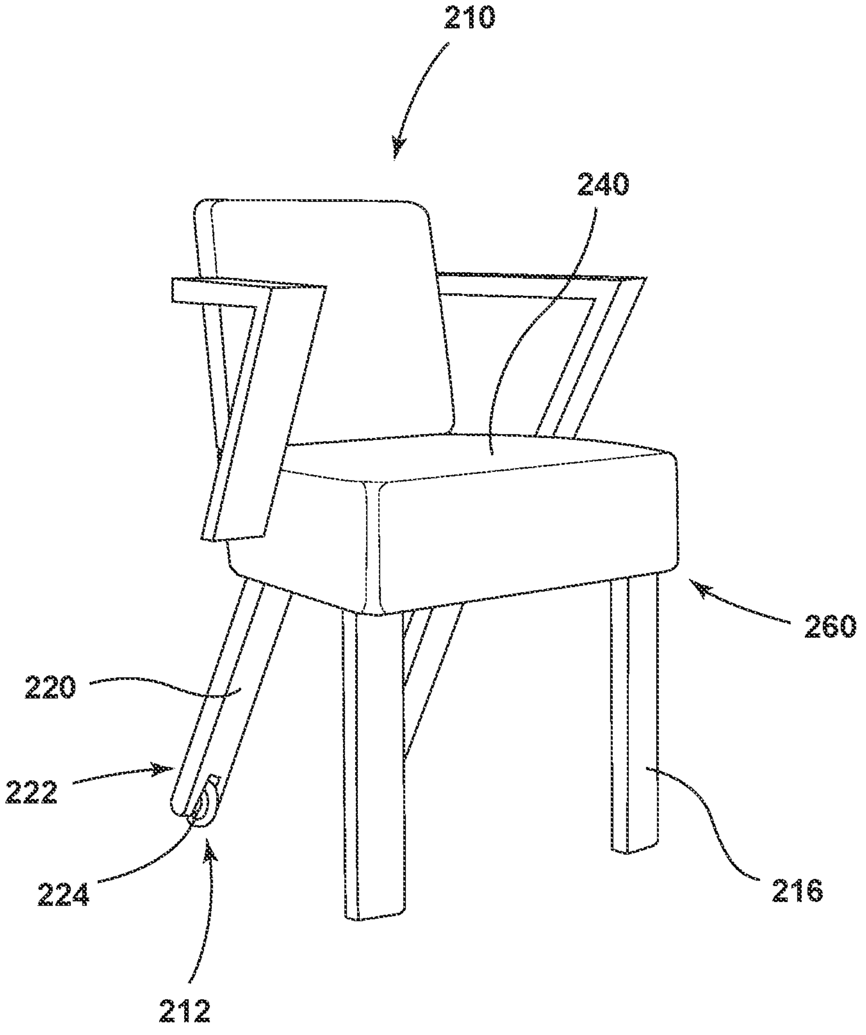
FIG. 30 is an exemplary perspective view of a chair incorporating an aspect of the friction adjustment interface and also an aspect of a self-contained seat cushion assembly.
Figure 31:
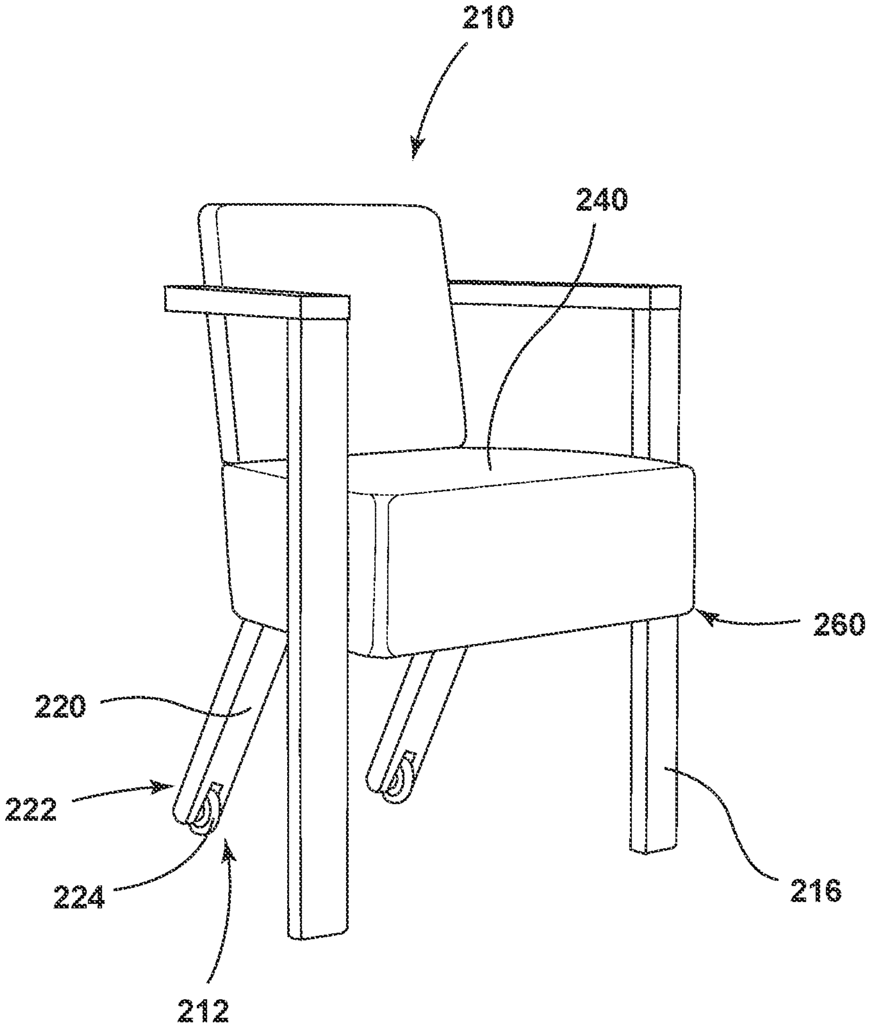
FIG. 31 is an exemplary perspective view of a chair incorporating an aspect of the friction adjustment interface and also an aspect of a self-contained seat cushion assembly.
Figure 32:
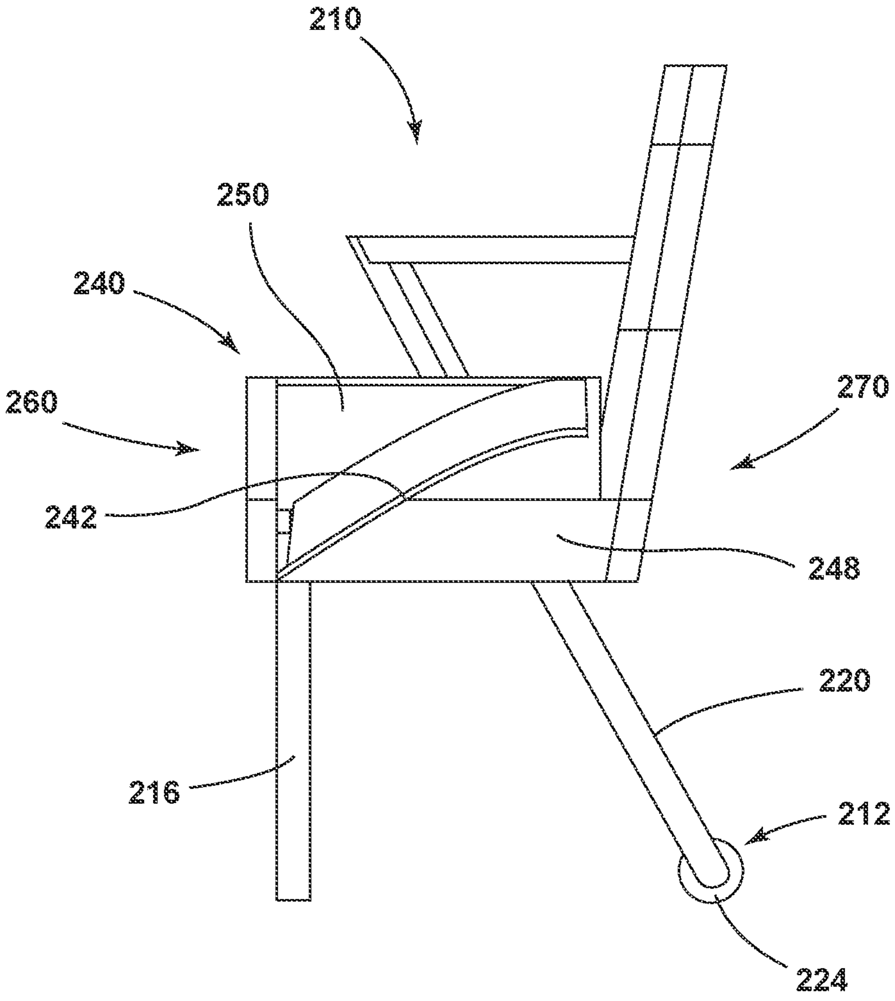
FIG. 32 is a schematic cross-sectional view of the seat of FIG. 30 and showing the component parts of the self-contained seat cushion assembly and illustrated in a resting position.
Figure 33:
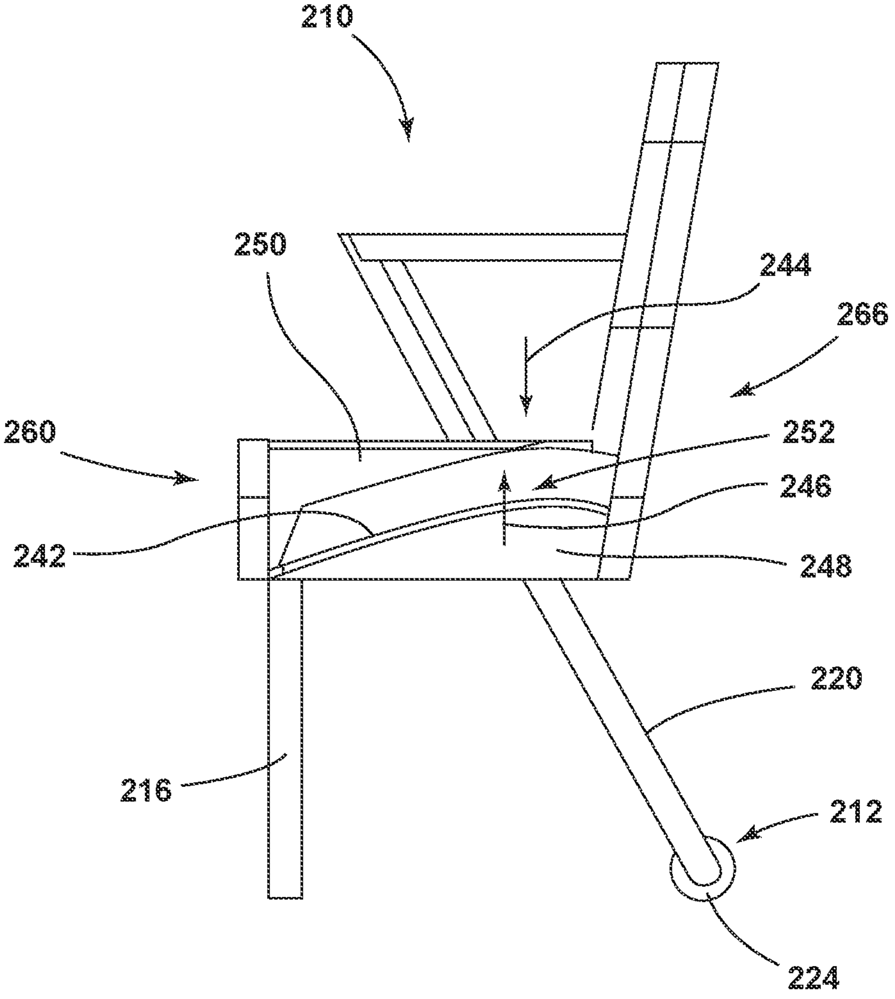
FIG. 33 is a cross-sectional view of the chair of FIG. 32 and showing the self-contained seat cushion assembly in the seated position.
Figure 34:
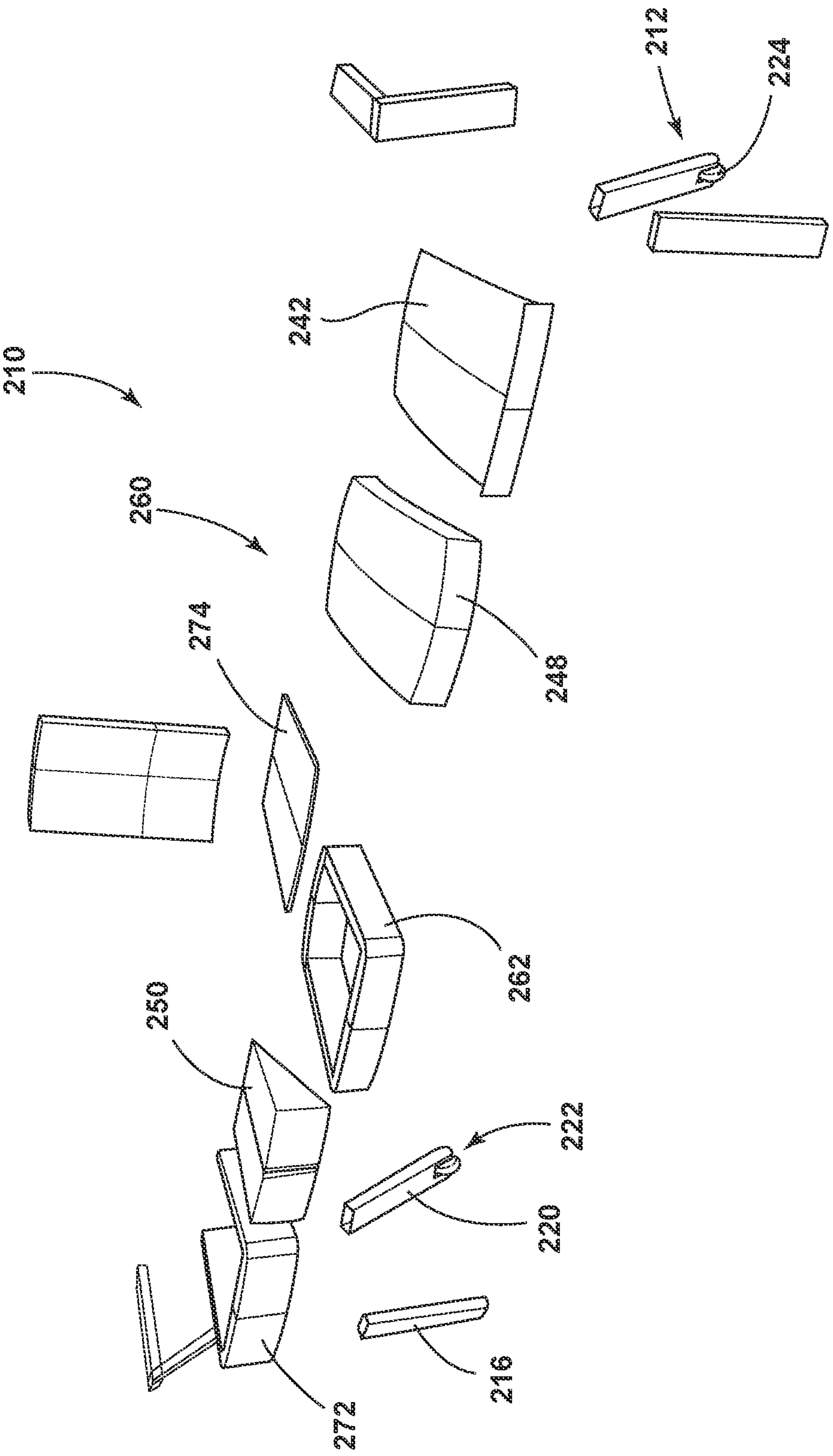
FIG. 34 is an exploded perspective view of the chair of FIG. 30.
Figure 35:
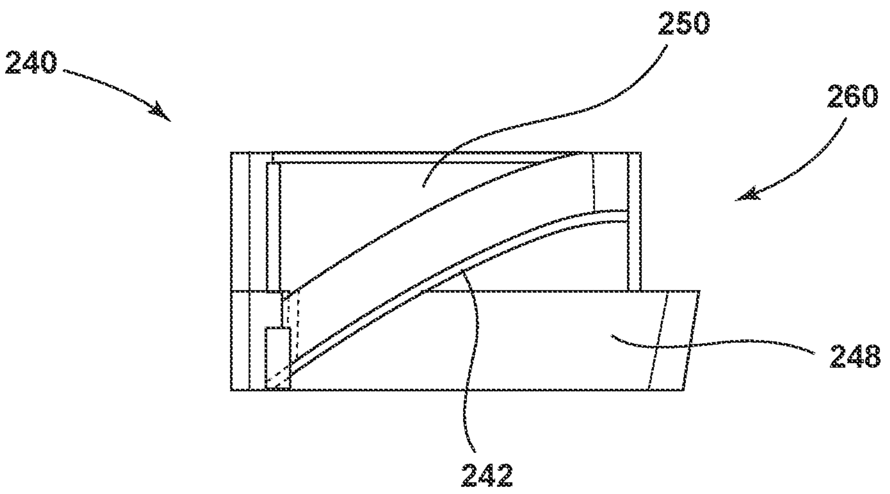
FIG. 35 is a schematic cross-sectional view of the self-contained seat cushion assembly.
Figure 36:
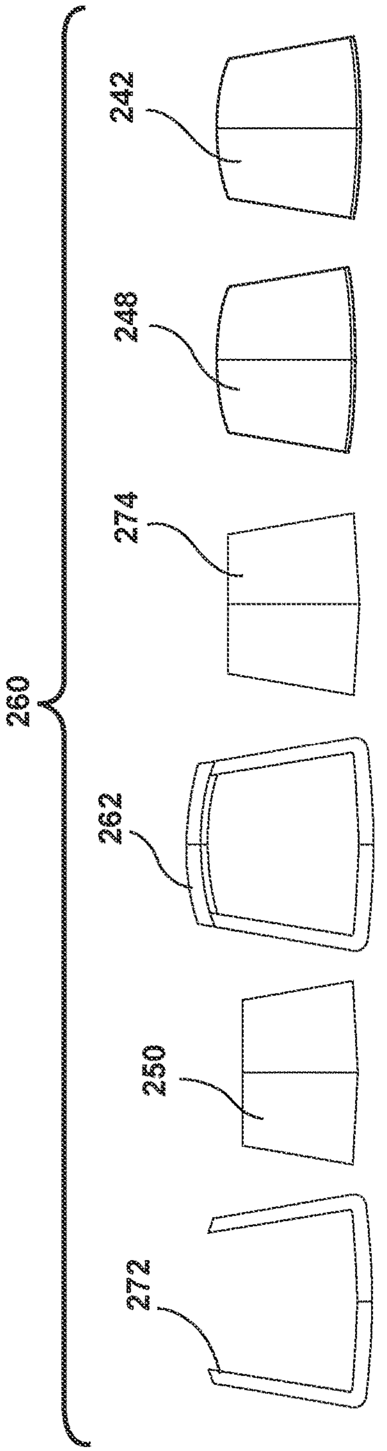
FIG. 36 is an exploded plan view of the self-contained seat cushion assembly and the component parts therefor.
Figure 37:
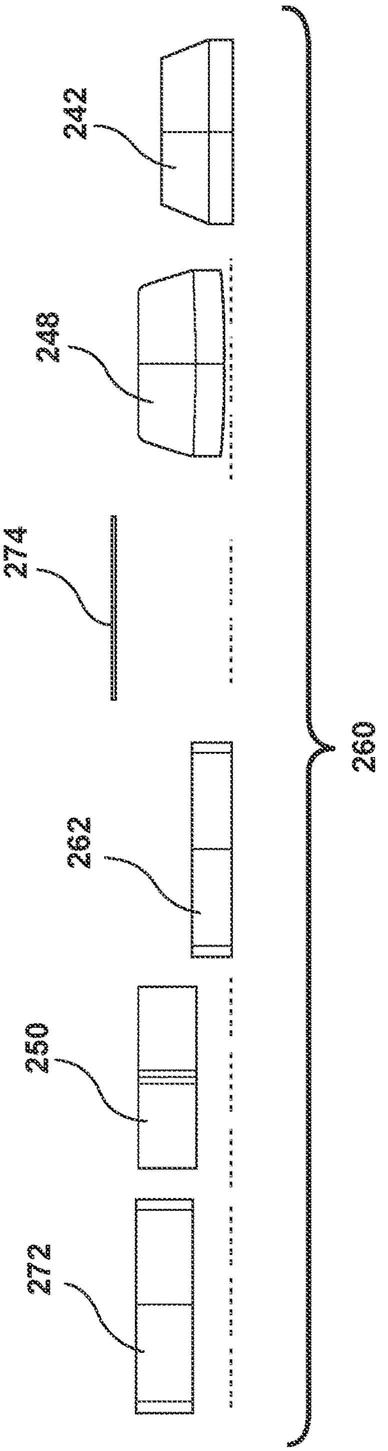
FIG. 37 is an exploded elevational view of the self-contained seat cushion assembly and the component parts therefor.
Figure 38:
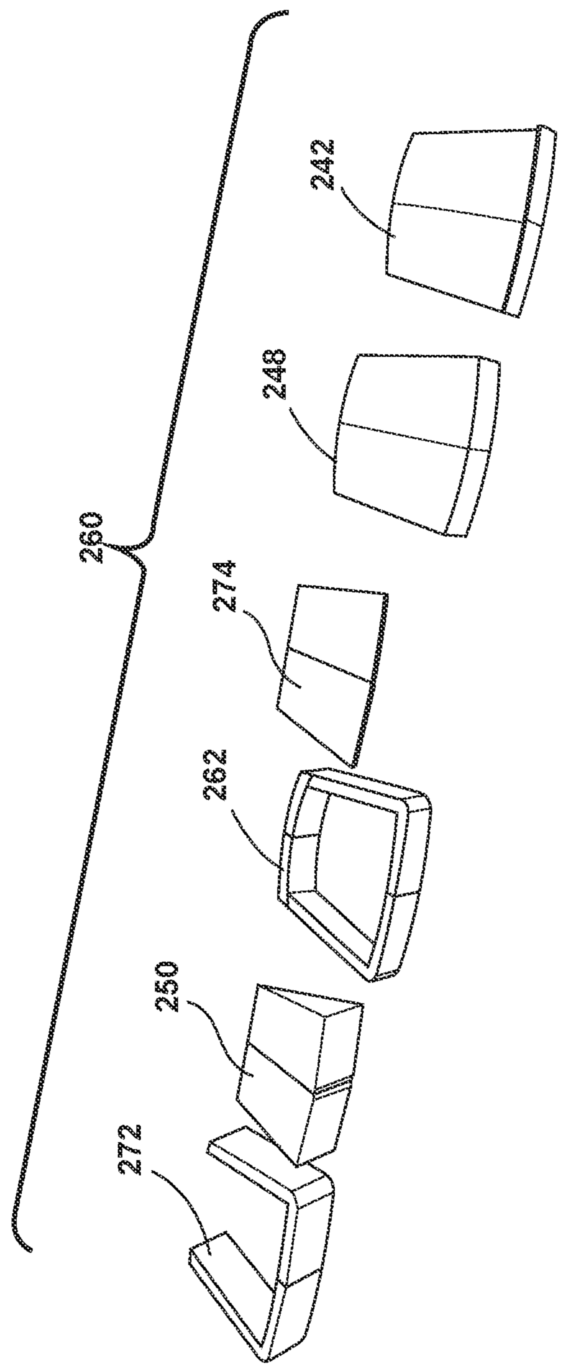
FIG. 38 is an exploded perspective view of the self-contained seat cushion assembly and the component parts therefor.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a patient experience interface that operates to stimulate the patient through a range of sensory experiences that operate within and around the patient space. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-10, reference numeral 10 generally refers to a sensory interface that is incorporated within a care setting as a patient experience interface for the patient. The sensory interface 10 can be a sensory therapy device 12 that includes a sensory experience frame 14 that surrounds a display 60, such as a television 16. The sensory experience frame 14 for the sensory therapy device 12 can house a plurality of sensory stimulation devices 66 that provide combinations of multi-sensory interactions that are intended to stimulate the senses of the patient in the patient space 20. The patient space 20 can be a room, house, apartment, or any area immediately surrounding the patient.

The term "patient" is used generically within this specification and is meant to refer to the individual that receives the sensory stimulation. It can refer to individuals that are admitted, under the care of another, living independently, and other similar situations and ranges of care. In this regard, the patient space 20 is the area surrounding the patient, wherever they may be located. In this manner, the term patient space 20 can refer to any one of various institutional settings or residential settings. The patient space 20 can also refer to indoor and outdoor spaces depending on the location and surrounding environment of the patient.

By way of example, and not limitation, the various sensory experiences can include, but are not limited to, lighting 30, air handling components 32, auditory components 34, fragrancing mechanisms 36, haptic and tactile interfaces 38, and other similar sensory experiences.

The lighting 30 can be in the form of a traditional lighting element or can be in the form of a variable lighting array 68 or combination of lighting elements that can be operated in any one or more illuminated and deluminated configurations. The lighting 30 can also be in the form of a sunlight simulation device 64. The sunlight simulation device 64 utilizes specific lighting elements that give off wavelengths of light that mimic a myriad of sunlight experiences. By mimicking sunlight, the sunlight simulation device 64 encourages the patient's brain to reduce the production of melatonin (a hormone that makes you sleepy) and increase the production of serotonin (a hormone that affects mood). The lighting elements incorporated into the sunlight simulation device 64 can be in the form of various wavelengths that produce various colors of light, color temperatures, hues, intensities of lights, various levels of UV light or UVB light and other lighting configurations. The sunlight simulation device 64 can operate independently or can operate in conjunction with any one or more of the other sensory stimulation devices 66. As discussed herein, these sensory stimulation devices 66 can include, but are not limited to the display 60, auditory components 34, air handling components 32, fragrancing mechanisms 36, tactile interfaces 38 and other aspects of the sensory interface 10 of the patient experience interface.

The sunlight simulation device 64 and the other sensory stimulation devices 66 can be activated and deactivated in any one of various sequences of activations. These sequences of activations can be predetermined to mimic specific experiential conditions, such as a sunny day in a park, or sitting on a beach. The sequence of activations an also be randomized to interface with the senses of the patient in an unpredictable way or a way that the patient must attempt to decipher and/or articulate. The various sequences of activations typically include simultaneous, contemporaneous, or overlapping operation of at least two of the sensory stimulation devices 66. The various sequences of activations can also be activated and deactivated based upon various external factors. Such factors can include, but are not limited to, time of day, outside temperature, weather, and other similar external factors. The sequences of activations can also be activated based upon internal factors related to the patient. Such internal factors can include, but are not limited to, heart rate, breathing rate, amount of movement by a patient over time, the type of movement being undertaken by a patient, and other similar factors.

Referring again to FIGS. 1-10, the sunlight simulation device 64 can be incorporated into the experience frame 14 through an array 68 of lighting 30. This array 68 of lighting 30 can incorporate dedicated lighting elements, such as a plurality of sunlight simulation elements, that are used for activating the sunlight simulation device 64. These dedicated lighting elements can be a single lighting element of the array 68 or can be a fraction or all of the lighting elements of the array 68. Within the array 68, the elements of the sunlight simulation device 64 can be used to produce a wide range of illumination effects, as described herein. Using the array 68, the sunlight simulation device 64 can implement any one of various lighting experiences for the patient.

Referring again to FIGS. 1-10, the air handling device can be in the form of an air handling unit, such as a blower or other fan. The air handling device can also include heating and cooling units that can heat and cool or otherwise form treated air that moves through the sensory device. Various fragrancing, flavoring and other taste/olfactory components can be added to the air that moves through the air handling device for directing the treated air into the patient space 20. The auditory component can be in the form of various speakers, percussive mechanisms, and other similar noise generating, noise amplifying or noise making mechanisms.

It is contemplated that the various sensory stimulation devices 66 can be used sequentially, in combination, cooperatively and in other various permutations and configurations to stimulate a single sense of the patient, but more typically, multiple senses, and combinations of senses, of the patient at the same time or in a variety of sequences and patterns.

According to various aspects of the device, the sensory therapy device 12 can utilize the various sensory stimulation devices 66 to provide heightened experiences to one sense, or a specific combination of senses, of the patient while diminishing the stimulation of other senses. Subsequently, a different sense or combination of senses of the patient can be heightened while stimulation of the other senses can be diminished. A goal of the sensory therapy device 12 is to provide a variable, and typically non-repeating, interaction of various sensory components using the sensory therapy device 12. Accordingly, the therapy device 12 can isolate specific senses of the patient to produce heightened experiences among each of the patient's senses over time.

The sensory therapy device 12 can be wirelessly controlled, controlled through a remote within the room, preprogrammed, combinations thereof, or otherwise operated by various controllers for manipulating the configuration of the sensory stimulation devices 66 of the sensory therapy device 12. The sensory therapy device 12 can also be programmed to respond to certain movements of the patient. In such an aspect of the device, where the patient performs a repeated activity, the sensory therapy device 12 can modify the sensory experience during each successive occurrence of the repeated activity. Though this configuration, a repeated activity can be a unique experience during each successive occurrence. These changes over time can be subtle or profound to activate different sensory perceptions of the patient in a variety of ways.

As exemplified in FIGS. 1-6, the sensory therapy device 12 can include a television 16 that is mounted above a patient's bed 50 or other area, such as a seating device. As exemplified in FIGS. 7-10, the sensory therapy device 12 can be a television 16 mounted at the foot 52 of a patient's bed 50. The sensory therapy device 12 can include a television 16 having the sensory experience frame 14 that includes at least one air vent or a plurality of air vents, lighting configurations, speakers, heating and cooling devices, blowers, and other similar sensory stimulation devices 66 that can be used to interact with the senses of the patient. Typically, the therapy device 12 will be directed to an area of the patient space 20 where the patient's head is located, such as the head of a patient's bed 50 or the upper portion of a chair 210.

It is contemplated that various haptic and tactile features can be positioned near the patient's bed 50 or at positions within the patient space 20. In such an embodiment, the sensory therapy device 12 can activate various tactile and other sensory components throughout the patient space 20, according to the random or predefined sequence. It is also contemplated that the sensory therapy device 12 can include at least one display 60 and can also include multiple displays 60 throughout the room for providing a range of sensory information to the patient throughout the course of the day and over extended periods of time. These secondary displays 60 can be positioned on windows, ceilings, furniture, walls, floors 226, or other surfaces within the patient space 20.

By way of example, and not limitation, the sensory therapy device 12 can include a plurality of screens or surfaces that can be made from LED devices or other similar flat panel displays 60. These flat panel displays 60 can be coordinated to cooperatively provide varying sensory interactions to the patient. Various mobile displays 60 can be also be utilized where the patient moves and the patient space 20 moves along with the patient. In this manner, the patient can take portions of the sensory device and the sensory stimulation devices 66 to appointments and other locations, such as portions of the hospital, healthcare facility or living space, or outside of the facility. Through the sensory therapy device 12, the system of sensory interactions can provide a consistent sensory interactive experience that can be used to stimulate the senses of the patient through various settings and conditions. This consistent sensory interactive experience can also be portable to move with the patient and the surrounding patient space 20.

Referring now to FIGS. 11-13C, a storage organizer 70 can be attached to a portion of a patient's bed 50 for providing storage areas for personal items and items of personal significance to the patient. These items, by being placed at the foot 52 of the patient's bed 50 or near the patient's bed 50, provide quick access to items that hold meaning to the patient and for stimulating various memories of the patient. In addition, various storage compartments 72 can be used for housing personal care items for providing a consistent location to the user. The positioning of the storage organizer 70 can assist in developing a consistent and repeatable routine for the patient for undertaking various daily tasks, personal care activities, and other daily routines. A surface of the storage organizer 70 can also include a display 60 that cooperates with the remainder of the sensory therapy device 12. The storage compartments 72 can also be visible from the patient's bed 50 so that items of significance can be easily and conveniently viewed by the patient.

It is also contemplated that the storage organizer 70 can include a catalog system that assists the patient, the patient's family, visitors and healthcare staff to identify the locations of items that are stored therein. The catalog system can include a list of items, various graphic indicia, photographs, digital tags, combinations thereof and other informational graphics to identify the proper location or placement of the patient's items, as discussed above.

The positioning of the storage organizer 70 provides placement for personal and significant items so that the room can be used for promoting identity and sense of place to the patient. By promoting routine and enhancing the sense of place and identity for the patient, therapies for dementia and Alzheimer's patients can be enhanced and supported throughout the day, and not just when formal therapies are occurring.

Referring now to FIGS. 14A-21E, a mobile device 90 can be utilized within a patient's room for storing, powering and charging patient's devices. The mobile device 90 can include a base 92 that houses one or more batteries that can be charged or replaced as needed. The device includes a protruding edge 94 that can be engaged with a wall-mounted charging station 96 to allow for convenient charging of the mobile device 90 as needed. The mobile device 90 and the charging station 96 can define a home position 98 of the device. This home position 98 can provide the patient with an additional sense of routine by continually replacing the mobile device 90 in the charging station 96. In various aspects of the device, the mobile device 90 can be fitted with a drive system and local positioning system that can automatically return the device to the home position 98 at the charging station 96 after certain periods of non-use.

The charging station 96 can include a tabletop 110 that can extend over a portion of the patient's bed 50 for providing a convenient task area for the patient. This task area can include one or more electrical outlets 112, USB ports, or other electrical interfaces that can be used with the patient's devices. The base 92 of the mobile device 90 can include a footrest and lockable wheels 224 for comfort and convenience. A mobile WiFi hotspot can be included within the mobile device 90 for maintaining connectivity with the patient's devices. Certain portions of the mobile device 90 can include storage pockets, storage cubicles and other storage apertures 114 for containing prescriptions, medical records and information, personal care items, task-related items, items of personal significance, and other items that may be closely related to the task space and mobile devices 90 owned and used by the patient. The mobile device 90 can also include one or more displays 60 that are integrated with the other components of the sensory therapy device 12.

According to the various aspects of the device, the charging station 96 and the mobile device 90 are configured to have a generally mating configuration. In this manner, the shape of the tabletop 110 of the mobile device 90 typically includes a profile that cooperatively engages with the profile of the charging station 96. Accordingly, the tabletop 110 and other horizontal surfaces of the mobile device 90 can include a rounded configuration, angular configuration or other shape, and the profile of the charging station 96 will include a respective profile to receive the mobile device 90 for charging and storage, as shown in an exemplary and non-limiting fashion in FIGS. 21D and 21E.

Referring now to FIGS. 22-25, a seating module 120 can be incorporated within the patient's bed 50 to provide a close seating position 122 next to the patient and the patient's bed 50. This seating module 120 can include a cassette 124 and an interior structure 126 that provides for extension and retraction of the seating surface 128. When extended, the seating surface 128 provides for a seating positon that can be used to provide a close and side-by-side seating orientation between the patient and the visitor. By providing and promoting a side-by-side seating configuration, the patient and the visitor can look at the same item in a convenient shoulder-to-shoulder fashion and discuss items of significance, discuss task items, discuss plans for the day and generally converse in a closer shoulder-to-shoulder setting, where people can easily share experiences important to the patient and enhance the communication between the patient and a visitor. In addition, the seating module 120 provides for a seating space next to the patient that is on the patient's similar level to provide a more convenient seating position 122 and viewing area in front of each of the patient and the visitor. The seating module 120 can be conveniently extended and retracted under the bed 50 for storage and use as needed or desired.

Referring now to FIGS. 26-29C, reference numeral 210 generally refers to a movement assistance chair 210 or a patient-assistance chair 210 that includes a friction-reducing interface 212 that can be used to assist an occupant of the chair 210 in moving the chair 210 relative to a table, counter or other support surface 214. The chair 210 includes a plurality of legs. These legs include two static front legs 216 that provide support to a front portion 218 of the chair 210. The plurality of legs also includes two low-friction rear legs 220 including operable ends 222 having wheels 224, castors or other wheeled interfaces positioned at the operable ends 222 of each of the rear legs 220. When an occupant of the chair 210 is seated at a support surface 214 or desiring to move closer to a support surface 214, the occupant can lean rearward such that more weight is placed upon the wheels 224 of the rear legs 220. At the same time, at least a portion of the weight is transferred from the front legs 216 and to the rear legs 220. Through this configuration, the interaction between the front legs 216 and the floor 226 defines a lesser amount of friction when a user leans rearward in the chair 210. This shift of weight from the front legs 216 and to the rear legs 220 changes the friction interface of the plurality of legs. This change in the friction interface decreases the amount of weight placed upon the front legs 216 and also lessens the friction in the front legs 216. At the same time, an increased amount of weight is placed upon the wheels 224 of the rear legs 220. This provides greater rearward movement through the wheels 224 positioned on the rear legs 220 for traversing a floor substrate on which the chair 210 is positioned. This change in the amount of friction experienced by the chair 210 allows the user to more conveniently manipulate the chair 210 by pushing against a counter, table or other support surface 214.

Referring again to FIGS. 29A-29C, the chair 210 can include various internal layers that assist a user in sitting down within and getting up from a seat 240 of the chair 210. The chair 210 can include an internal structure that includes a flexible member in the form of a resilient internal platform 242 to aid in egress into and out from the chair 210. When a user sits within the seat 240 of the chair 210, the weight of the occupant causes the resilient internal platform 242 to deflect in a downward direction 244. The resilient internal platform 242 is resilient and tends to return to its original shape. Accordingly, when a user attempts to exit the chair 210, the resilient internal platform 242 is biased toward its original shape and exerts a biasing force 246 in an upward direction 252. This biasing force 246 assists the user in moving in the upward direction 252 relative to the seat 240 of the chair 210. When a user sits down in the chair 210, the resilient internal platform 242 deflects and the biasing force 246 opposes the downward movement of the occupant. This opposition of forces cushions a user and slows their descent to a seated position 266 within the chair 210. In addition to the resilient internal platform 242, various high-density foam layers 248 and low-density foam layers 250 can be positioned above the resilient internal platform 242 to provide additional comfort and support for a user while in a chair 210.

Referring again to FIGS. 29A-29C, the flexible and resilient internal platform 242 can be in the form of a spring board or other resilient member that is attached to the structure of the chair 210. The resilient internal platform 242 can be attached at one edge of the structure, such as along the front or the rear edge of the resilient internal platform 242. This fixed connection with the structure of the chair 210 allows for the resilient internal platform 242 to exert the biasing force 246 in the upward direction 252 that assists the user of the chair 210 in descending and ascending with respect to the seat 240. It is also contemplated that the resilient internal platform 242 can be attached to the structure of the chair 210 along at least two edges of the resilient internal platform 242. In such an aspect of the device, a central area of the resilient internal platform 242 can deflect and resiliently return to an original shape. This configuration of the resilient internal platform 242 can be used to exert the biasing force 246 in the upward direction 252 that assists the user of the chair 210 in descending and ascending with respect to the seat 240.

Referring now to FIGS. 30-38, aspects of the chair 210 can include a self-contained seat cushion assembly 260 that incorporates aspects of the resilient internal platform 242 for providing the biasing force 246 in the upward direction 252 to assist a user out of the chair 210. Additionally, as discussed herein, the resilient internal platform 242 also assists an occupant with respect to descending and taking a seated position 266 in the chair 210. The self-contained seat cushion assembly 260 can be incorporated within a chair frame of the chair 210 such that the various legs, arms, back and other chair frame components can be attached to a frame member 262, typically in the form of a perimeter frame member 262, of the cushion assembly 260. Accordingly, the self-contained seat cushion assembly 260 can be incorporated within any one of various chairs, couches, benches and other seating configurations.

Referring again to FIGS. 30-38, the seat cushion assembly 260 includes a frame member 262, various foam members that form an upper seat cushion. The upper seat cushion can include the high-density foam layer 248 and the low-density foam layer 250. These high-density and low-density foam layers 248, 250 can include a heavy density foam and a light density foam as well as other foam portions of varying density positioned within the seat cushion assembly 260. The flexible seat pan or resilient internal platform 242 is included within the seat cushion assembly 260 to assist the users in exiting the chair 210 from the seated position 266. A fabric material can be wrapped around the outer surface of the seat cushion assembly 260 to match the fabric of any one of various seating members, as described herein. Typically, the resilient internal platform 242 includes a metallic pan having a resilient material and shape.

As exemplified in FIGS. 32-38, the resilient internal platform 242 is defined by a resilient member that is configured to deflect from a resting position 270. This resting position 270 is typically in a more upright or steep angled orientation that slopes from the rear of the seat cushion assembly 260 and downward to the front of the seat cushion assembly 260. The resilient internal platform 242 rests upon the surrounding frame member 262 and typically attaches to a static portion of an interior surface of the perimeter frame member 262 of the seat cushion assembly 260. This static portion is configured to remain relatively stable and resist deflection when the chair 210 is being used and the resilient internal platform 242 is undergoing flexion. This engagement between the perimeter frame member 262 and the resilient internal platform 242 provides for a movement space through which the resilient internal platform 242 can operate to move from the resting position 270 to the seated position 266. As described herein, the seated position 266 is more of a generally horizontal configuration of the resilient internal platform 242. In this seated position 266, the resilient internal platform 242, being a resilient member, continually exerts a biasing force 246 in the upward direction 252 to assist the user in exiting the chair 210. When the user desires to exit the chair 210, the preloaded biasing force 246 of the resilient internal platform 242 provides the biasing force 246 in the upward direction 252 that allows the user to exert less energy in rising from the seated position 266 to a standing position. The resilient internal platform 242 can include a resilient plastic or metallic sheet. The resilient internal platform 242 can also include internal springs that assist in generating the biasing force 246 in the upward direction 252.

According to the various aspects of the device, the resilient internal platform 242 as well as the magnitude of the biasing force 246 can be modified or calibrated to provide a sufficient biasing force 246 for users having a height and weight that can vary across a wide range of demographics. These adjustments can be made by changing the thickness of the material of the resilient internal platform 242 or by adding various springs or other resilient members or biasing members.

Referring again to FIGS. 35-38, the self-contained seat cushion assembly 260 can include a frame member 262 that contains and/or supports a light density foam or low-density foam layer 250 that rests upon the heavy density foam or the high-density foam layer 248. These foam layers 248, 250 rest upon the resilient internal platform 242 and other biasing mechanisms that may be incorporated within the seat cushion assembly 260. As discussed herein, the resilient internal platform 242 can be a weight-activated flexible seat pan that flexes based upon the amount of weight or downward force applied to the seat cushion assembly 260. In this manner, a distance of the seating position of the resilient internal platform 242 below the resting position 270 is related to a magnitude of downward force, or weight, that is exerted by a user on the resilient internal platform 242. This distance that the resilient internal platform 242 travels also determines the degree of the upward biasing force 246 that is exerted by the resilient internal platform 242 toward the resting position 270. The seat cushion assembly 260 can also include a soft foam member 272 that surrounds the frame member 262 and also a topper sheet 274 that can be in the form of a comfort layer that is placed above the low-density foam layer 250. As discussed herein, an outer fabric can be placed around at least a portion of the seat cushion assembly 260.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A movement assist chair for use in a patient space, the movement assist chair comprising:
- a chair frame having a back and a plurality of legs;
- a seating module that is attached to the chair frame and includes an upper seat cushion;
- a resilient internal platform positioned within the seating module and below the upper seat cushion, wherein
  - the resilient internal platform is biased to a resting position;
  - upon a patient resting upon the resilient internal platform, the resilient internal platform deflects in a downward direction toward a seating position that is below the resting position and contemporaneously exerts an upward biasing force that assists the patient in reaching a seated position and also assists the patient is moving upward from the seated position to exit the seating module; and
  - the upward biasing force of the resilient internal platform is exerted continuously when the resilient internal platform is distal from the resting position, and wherein the upward biasing force increases in magnitude as the seating position of the resilient internal platform moves farther from the resting position of the resilient internal platform.

2. The movement assist chair of claim 1, wherein the plurality of legs includes static front legs and low-friction rear legs.

3. The movement assist chair of claim 2, wherein the low-friction rear legs include wheeled interfaces for adjusting a friction interface between the chair and a floor substrate.

4. The movement assist chair of claim 3, wherein rearward movement by a user results in a decreased amount of weight in the static front legs and an increased amount of weight on the low-friction rear legs.

5. The movement assist chair of claim 1, wherein the seating module includes a perimeter frame member that receives the resilient internal platform.

6. The movement assist chair of claim 5, wherein the upper seat cushion includes a high-density foam layer and a low-density foam layer, and wherein the resilient internal platform is a metallic pan that is attached to the perimeter frame member of the seating module at only one edge of the resilient internal platform.

7. The movement assist chair of claim 5, wherein the resilient internal platform is operable from the resting position to the seating position that is below the resting position, wherein a distance of the seating position below the resting position is related to a downward force that is exerted by a user on the resilient internal platform.

8. The movement assist chair of claim 5, wherein the perimeter frame member of the seating module defines a movement space that provides for movement of the resilient internal platform between the resting position and the seating position, wherein the movement space also allows for movement of the resilient internal platform under the upward biasing force toward the resting position.

9. A seating module for use with a chair frame, the seating module comprising:

a perimeter frame member;

a resilient internal platform that is attached to the perimeter frame member at a static portion;

an upper seat cushion that is disposed on top of a resilient internal platform, wherein:

the resilient internal platform is biased to an original shape that defines a resting position;

upon a patient resting upon the resilient internal platform, the resilient internal platform deflects in a downward direction toward a seating position and contemporaneously exerts an upward biasing force that assists the patient in reaching a seated position and also assists the patient is moving upward from the seated position;

the upward biasing force of the resilient internal platform is exerted continuously when the resilient internal platform is distal from the resting position; and the upward biasing force increases in magnitude as the seating position of the resilient internal platform moves farther from the resting position of the resilient internal platform.

10. The seating module of claim 9, wherein the upward biasing force is exerted exclusively by the resilient internal platform.

11. The seating module of claim 9, wherein the upward biasing force is exerted, at least in part, by a biasing member that is attached to the resilient internal platform.

12. The seating module of claim 9, wherein the resilient internal platform attaches to an interior surface of the perimeter frame member and extends through a movement space defined at least above the perimeter frame member, wherein the movement space provides for movement of the resilient internal platform between the resting position and the seating position, wherein the movement space also allows for application of the upward biasing force of the resilient internal platform toward the resting position.

13. The seating module of claim 9, wherein the seating position is related to a downward force that is exerted by a user on the resilient internal platform, and wherein the resilient internal platform is a metallic pan that is attached to the perimeter frame member at only one edge of the resilient internal platform.

14. The movement assist chair of claim 1, wherein the upward biasing force is exerted exclusively by the resilient internal platform.

15. The movement assist chair of claim 1, wherein the upward biasing force is exerted, at least in part, by a biasing member that is attached to the resilient internal platform.

* * * * *